United States Patent
Martin

(10) Patent No.: US 6,345,250 B1
(45) Date of Patent: Feb. 5, 2002

(54) DEVELOPING VOICE RESPONSE APPLICATIONS FROM PRE-RECORDED VOICE AND STORED TEXT-TO-SPEECH PROMPTS

(75) Inventor: David G. Martin, Eastleigh (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/253,179

(22) Filed: Feb. 19, 1999

(30) Foreign Application Priority Data

Feb. 24, 1998 (GB) .............................. 9804675

(51) Int. Cl.[7] .............................. G10L 13/04
(52) U.S. Cl. .................... 704/260; 379/88.16
(58) Field of Search ................ 704/266, 260, 704/258; 379/88.01, 88.02, 88.16

(56) References Cited

U.S. PATENT DOCUMENTS

| | | | | |
|---|---|---|---|---|
| 4,717,261 A | * | 1/1988 | Kita et al. ................ 368/63 |
| 5,771,276 A | * | 7/1998 | Wolf ...................... 379/88.16 |
| 5,915,001 A | * | 6/1999 | Uppaluru ................ 379/88.22 |
| 5,953,392 A | * | 9/1999 | Rhie et al. .............. 379/88.13 |

FOREIGN PATENT DOCUMENTS

EP    0 605 166 A1    6/1994    ............ H04M/3/50

* cited by examiner

*Primary Examiner*—William Korzuch
*Assistant Examiner*—Donald L. Storm
(74) *Attorney, Agent, or Firm*—Jerry W. Herndon

(57) ABSTRACT

An interactive voice response application on a computer telephony system includes a method of playing voice prompts from a mixed set of pre-recorded voice prompts and voice prompts synthesised from a text-to-speech process. The method comprises: reserving memory for a synthesised prompt and a pre-recorded prompt associated with a particular prompt identifier; on a play prompt request selecting the pre-recorded prompt if available and outputting through a voice output; otherwise selecting the synthesised prompt and playing the selected voice prompt through the voice output. If neither pre-recorded or synthesised data are available then text associated with the voice prompt is output through a text-to-speech output.

9 Claims, 5 Drawing Sheets

| Prompt identifier | Prompt text data | Prompt text-to-speech data | Prompt voice data |
|---|---|---|---|
| Welcome | Welcome to the application | | ⋀⋁⋀⋁⋀⋁⋀ |
| Select | Please select from the following options | ⋀⋁⋀⋁⋀⋁⋀ | |
| Option 1 | Press '1' if you wish to hear the time | ⋀⋁⋀⋁⋀⋁⋀ | ⋀⋁⋀⋁⋀⋁⋀ |
| Option 2 | Press '2' if you wish to hear the date | ⋀⋁⋀⋁⋀⋁⋀ | |
| Option 3 | Press '3' if you wish to exit | ⋀⋁⋀⋁⋀⋁⋀ | |
| Exit | Thank you for using the application | ⋀⋁⋀⋁⋀⋁⋀ | |

DEVELOPING VOICE RESPONSE APPLICATIONS FROM PRE-RECORDED VOICE AND STORED TEXT-TO-SPEECH PROMPTS

FIELD OF INVENTION

This invention relates to developing voice response applications and the apparatus and methods for doing so.

BACKGROUND OF INVENTION

The development of an interactive voice response application to work in a telephony system is the major part of the total solution once the platform and hardware have been set up. The financial resources needed for the development can be in the same order of magnitude as the hardware costs and there always exists the need to improve on development techniques and reduce time and financial commitments.

An area where large amounts of development time is taken up is recording voice prompts for use in the application. Invariably the structure of the application is changed, features need to be added and new voice prompts have to be recorded after the initial recording. Recording voice prompts at two or more different times incurs valuable time and resources.

When pre-recorded prompts already exist the problem is more complex since the new prompts will ideally match the old prompts in style and accent. A lack of pre-recorded voice segments for playing to the caller and enabling 'navigation' of the telephony application is a significant factor which can slow down the development of the application. Therefore when pre-recorded prompts exist it is preferable to use them during development but not to record new prompts until development is over.

One attempt at lessening the burden of the problem has been attempted by the applicants in its DirectTalk/2 Development Tool Kit. A database of the voice prompts comprised prompt identifiers together with respective prompt text data corresponding to the voice that would be recorded at a later time. A voice application flag was set to indicate when the prompt voice data was incomplete. When this flag was set the routine for playing the prompt voice data would divert to a text-to-speech routine and the corresponding prompt text data was output using the text-to-speech adapter. This solution is very all or nothing and makes no use of incomplete sets of pre-recorded voice prompts.

SUMMARY OF INVENTION

According to one aspect of the present invention there is provided in an interactive voice response (IVR) development system having a recorded voice generator and a text-to-speech synthesiser, a method of processing a prompt identifier in an IVR application, said IVR application comprising at least one prompt identifier and a prompt database, each voice prompt identifier having a data structure within the prompt database for storing: associated voice prompt data; associated synthesised prompt data; and associated text prompt data for text-to-speech processing, the method comprising steps: searching the prompt database for data associated with the prompt identifier; sending the voice prompt data to the recorded voice generator if voice prompt data is available; sending the synthesised prompt data to the recorded voice generator if voice prompt data is not available and if the synthesised prompt data is available; sending text prompt data to the text-to-speech synthesiser if the text prompt data is available and if both voice prompt data and synthesised prompt data are not available.

Preferably each of a plurality of voice prompts is associated with a respective one of a plurality of pre-recorded memory locations and one pre-recorded voice prompt location is checked in response to one voice prompt play command in the IVR application.

The voice prompt is most preferably associated with a synthesised voice prompt memory location and the synthesised voice prompt memory location is checked for synthesised voice prompt data. An IVR output is selected and synthesised voice prompt data is sent to the IVR output if synthesised voice prompt data is available in the memory location.

The voice prompt is also favourably associated with a voice prompt text memory location for storing voice prompt text and the voice prompt text memory location is checked for voice prompt text. A text-to-speech output is selected and the voice prompt text is sent to the text-to-speech output if voice prompt text is available in the memory location.

Such a solution provides a faster and more programmer friendly environment for the development of interactive voice response applications. Furthermore significant costs of recording and storing infrequently used voice phrases or words.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
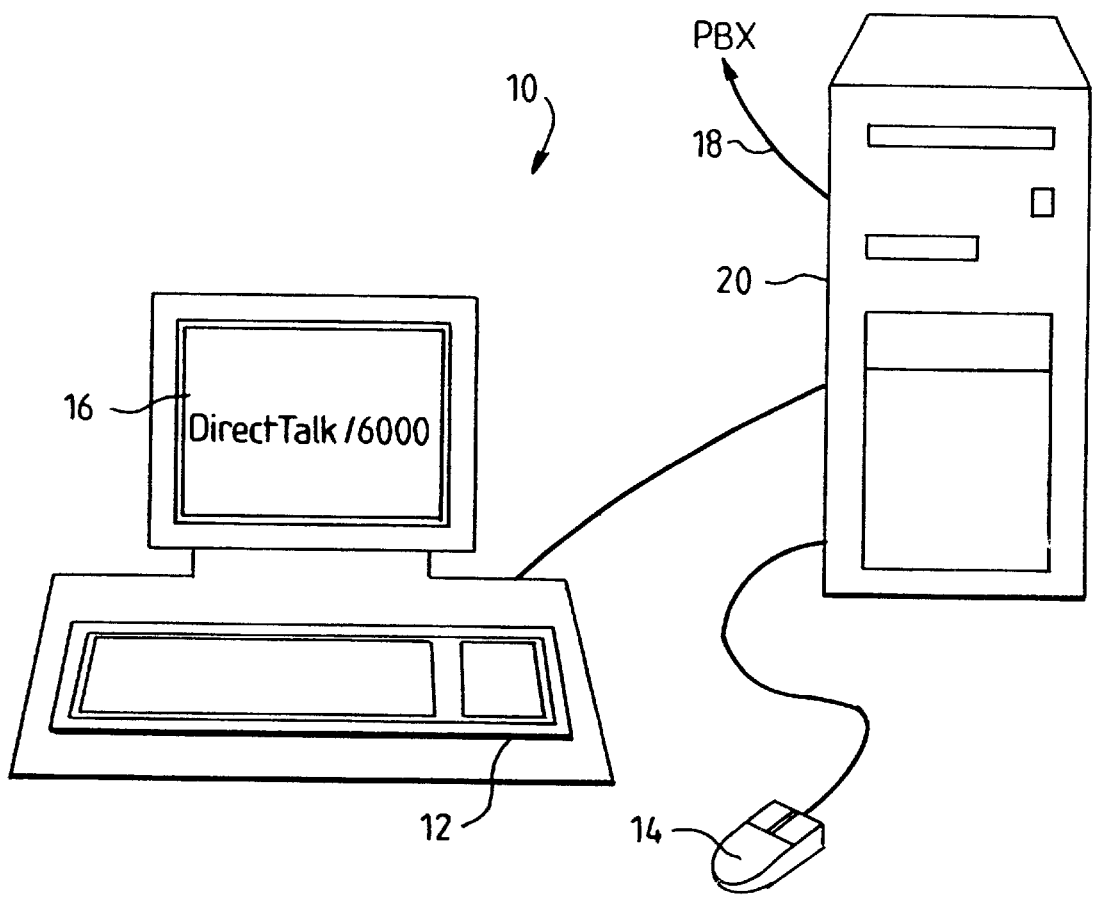
FIG. 1 is a schematic representation of a computer platform used in an embodiment of the invention.
Figure 2:
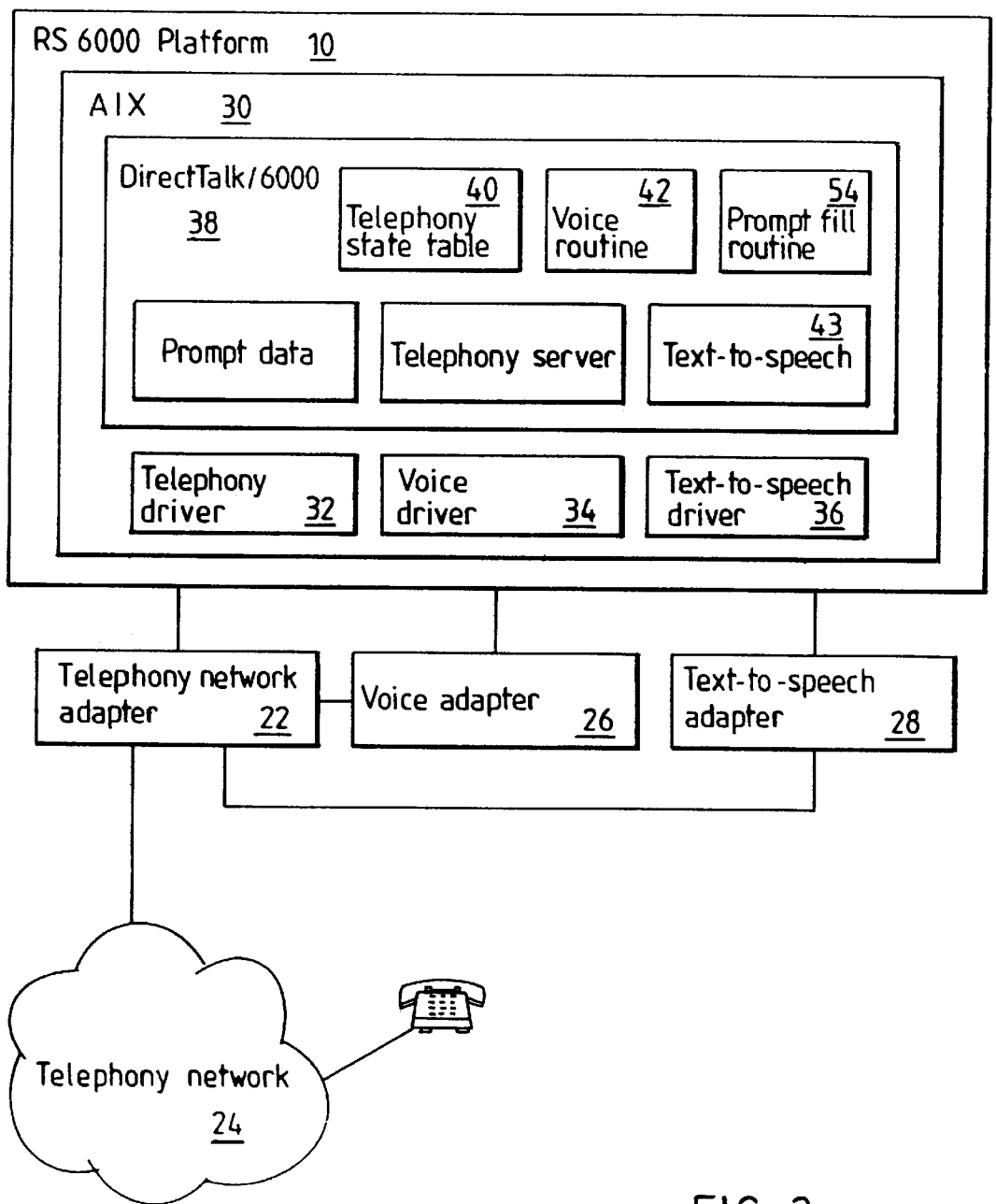
FIG. 2 is a schematic of components of the embodiment.

A central hardware component of the embodiment is a computer 10 such as IBM's RS/6000 with keyboard 12, mouse 14, monitor 16 and connection 18 to the telephony network (see FIG. 1). The computer includes a motherboard and hard drive (not shown) inside a tower casing 20. Connected to the motherboard is a telephony network adapter 22 connected to a public telephony network 24, a voice adapter 26 for playing voice prompts over a connection to the telephony network and a text-to-speech adapter 28 for converting text data into voice and playing it over a connection to the telephony network 24 (see FIG. 2).

The motherboard includes a microprocessor such as a Power PC processor, memory and IO controllers to interface with the adapters. In operation the computer 10 uses an operating system such as IBM's AIX 30 which includes telephony network driver 32, voice driver 34 and text-to-speech driver 36 components to control the adapters connected to the motherboard. On top of the operation system is a telephony application 38 such as IBM's DirectTalk for AIX. The sequence of instructions that controls the telephony application 38 comes from a telephony state table 40 written by the developer. In the main it is this state table 40 that is under development and which contains voice prompt commands for playing voice prompts. The application 38 further includes a voice prompt play routine 42 which is accessed whenever a voice prompt command is referenced in the state table 40. A text-to-speech routine 43 is accessed from the state table with a stateable command such as play_text(hello and welcome to the application). This routine acquires the text within the parenthesis and uses the text-to-speech driver 36 to send the text to the text-to-speech adapter 28.

A voice prompt command in the state table may take the form 'play_prompt (hello)' where the 'hello' in parenthesis is a voice prompt identifier 44. In normal operation, when the processor reaches such a command in the state table 40 it jumps to the voice routine 42, voice data corresponding to the prompt indicator 'hello' is fetched and the voice driver 34 is called. The voice driver 34 makes certain hardware calls to the voice adapter 26 using the voice data and the user hears a 'hello' voice prompt over the connection.

Figure 3A:
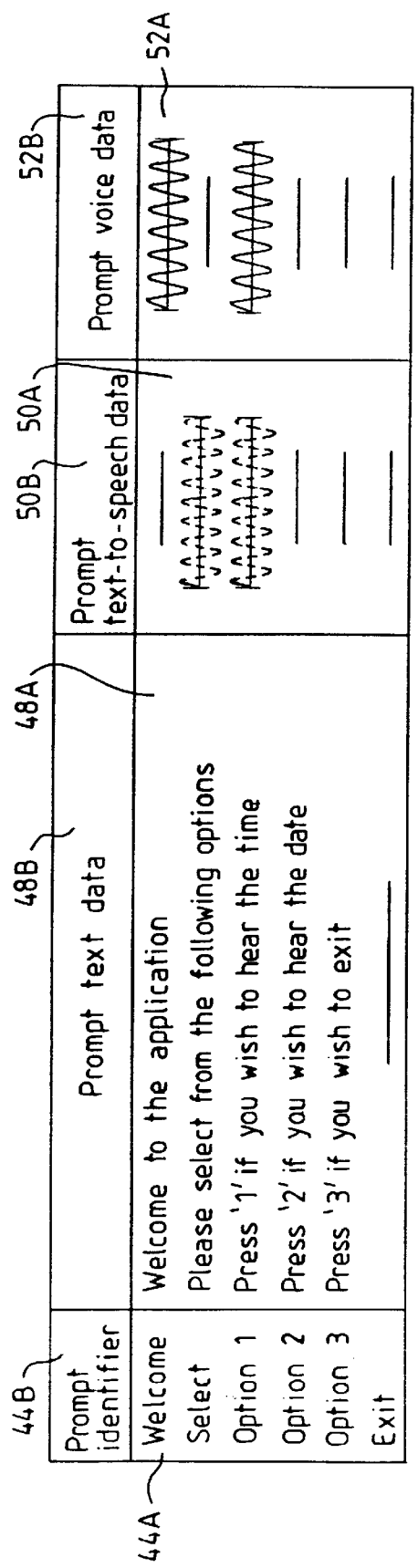
FIG. 3A represents a prompt database.
Figure 3B:
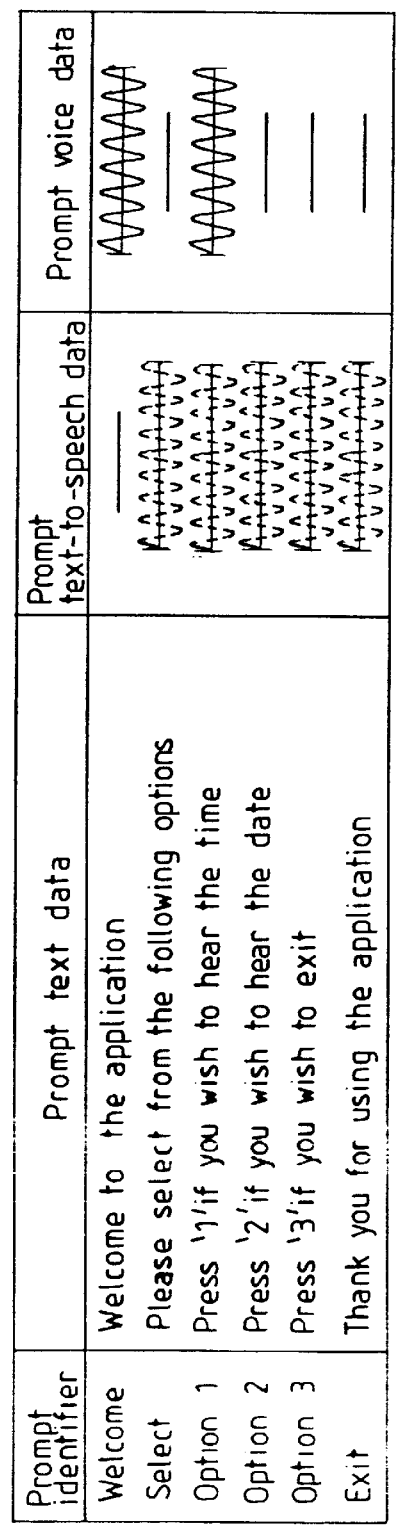
FIG. 3B represents a prompt database after text-to-speech conversion.

The prompt data structure of the embodiment is stored in a database table 46 within the telephony application 38 (see FIG. 3). Each prompt has an identifier 44A such as 'welcome' so that the prompt may be referenced which is stored in a prompt identifier field 44B. Each prompt has a prompt text data field 48B for storing a text string 48A associated with prompt and identified by the prompt identifier 44A, in this case the text data 48A is 'welcome to the application'. All the prompts in FIG. 3A have text data 48A associated with them except for the 'exit' prompt.

Each prompt data structure has a text-to-speech field 50B for storing synthesised voice data 50A corresponding to the text data 48A. This synthesised voice data 50A is produced by calling a text-to-speech routine 43 and referencing the text data 48A. The text-to-speech routine 43 uses the text data 48A and makes calls to the text-to-speech driver 36 which in turn makes hardware requests to the text-to-speech adapter 28. The resulting data is acquired back through the text-to-speech driver 36 and text-to-speech routine 43 and stored in the prompt text-to-speech field 48B. In FIG. 3A only two of the prompts 'select' and 'option 1' are shown to have synthesised voice data 48A. The output of the text-to-speech adapter 28 may be played over a connection directly or stored and then played through the voice adapter 26 over a connection.

Each prompt data structure has a voice data field 52B for storing high quality recorded voice data 52A. This is played by calling the voice routine 42 and referencing the prompt identifier 44A. In FIG. 3A only the 'Welcome' and 'option 1' prompts have any voice data 52A stored.

Figure 4:
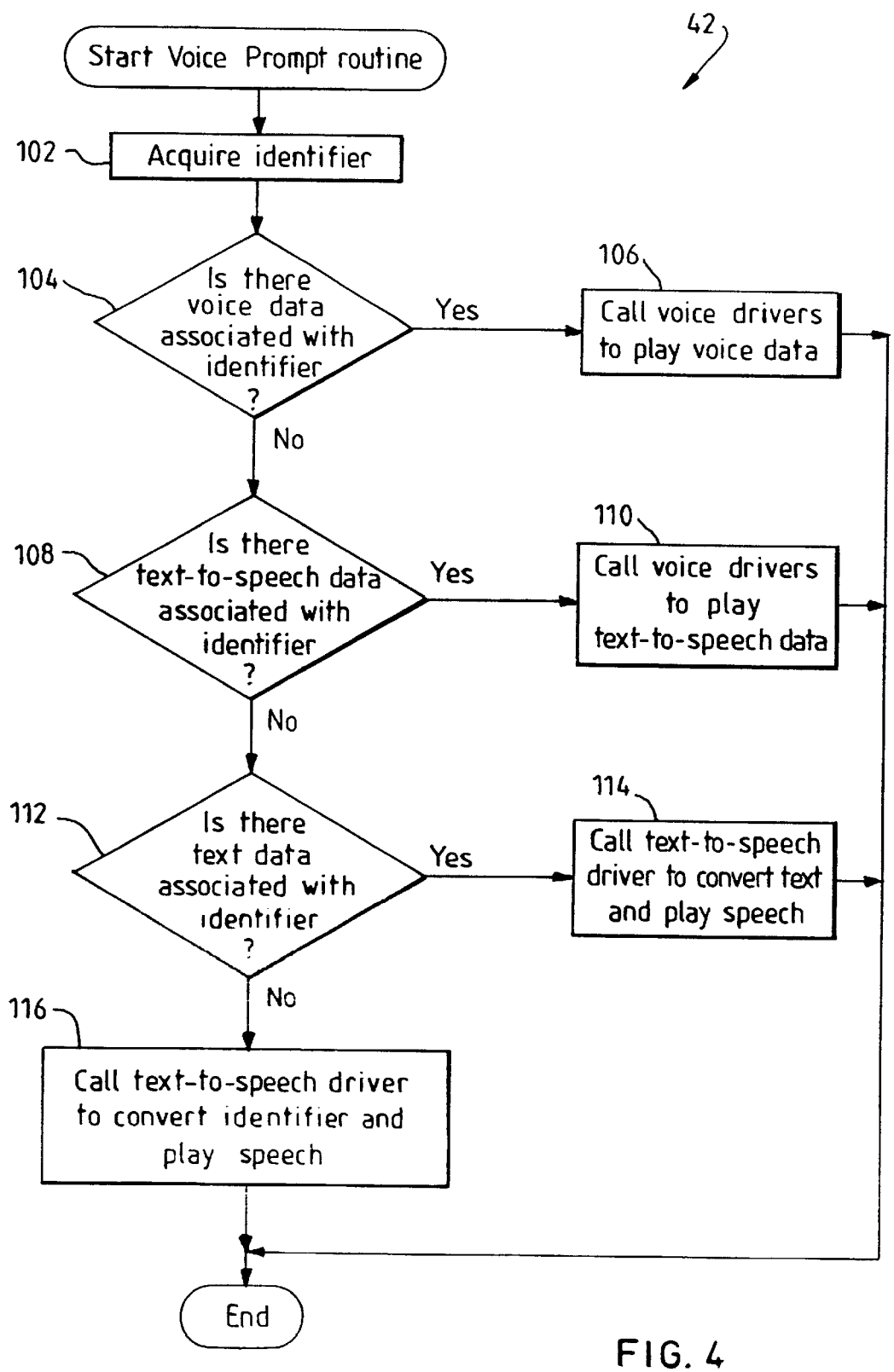
FIG. 4 is a flow diagram of the steps of the embodiment.
Figure 5:
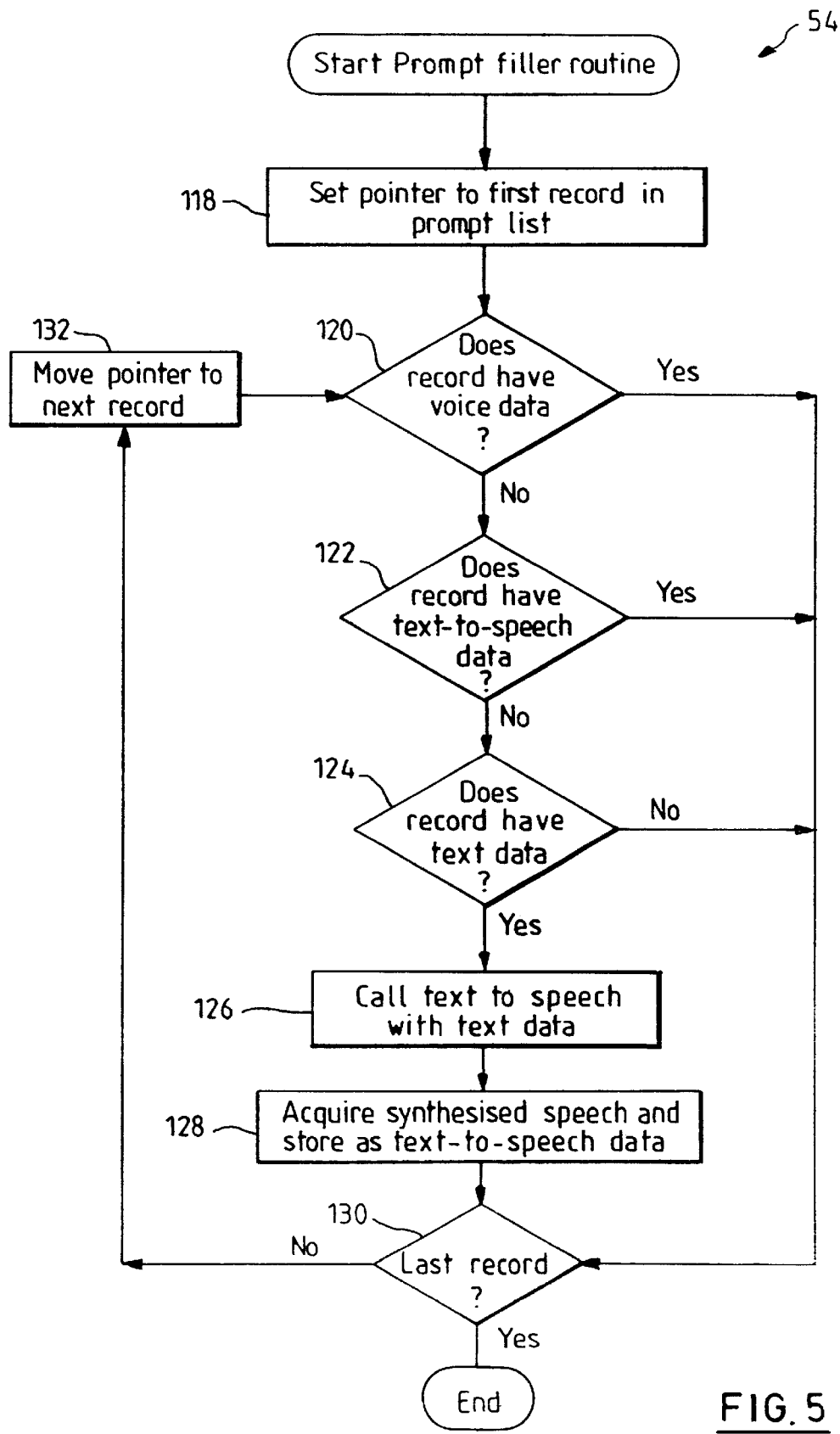
FIG. 5 is a flow diagram of steps of another aspect of the invention.

The voice prompt routine 42 is part of the telephony application 38. It is called when the processor reaches a voice prompt command (including a voice prompt indicator 44A) in a state table 40. The steps of the voice prompt routine 42 are as follows (see FIG. 4). Acquire 102 the voice prompt identifier 44A from the state table command, normally such a command will be in the form of play_prompt (hello) where the identifier 44A is between parenthesis. On acquiring the identifier 44A the prompt database table 46 is checked 104 to see if there is voice prompt data 52A associated with the identifier 44A. For instance if the identifier 44A was 'welcome' the answer is yes (see FIG. 3A) but if the identifier 44A is 'select' the answer is no (see FIG. 3A). On a yes answer the routine 42 follows the normal (prior art) procedure of calling 106 the voice driver 34 with the voice prompt data 52A and then ends the routine. However in this embodiment, on a 'no' answer the routine queries 108 the prompt data to see if there is synthesised or text-to-speech data 50A associated with the identifier 44A. If the answer is 'yes' then the routine 42 will call 110 the voice driver 34 with the text-to-speech data 50A and if the answer is 'no' then the routine will pass on to the next step 112. For instance, if the identifier is 'select' then the routine will call the voice driver with the synthesised data. However if the identifier is 'option 2' the routine will pass on.

The next step is a query 112 on text data associated with the identifier. If such text data exists then the routine calls 114 the text-to-speech driver with the text data. For instance if the identifier is 'option 2' (FIG. 3A) then the text-to-speech driver will be called with the text 'Press '2' if you wish to hear the date'. If no such text data exists then the text-to-speech driver is called 116 with the text of the identifier itself. For instance if the prompt identifier is 'exit' then (in FIG. 3A) there is no prompt text data associated with it (or any text-to-speech data and voice data) and the text-to-speech driver is called with the text 'exit'. This is the last step of the routine.

Alternatively or in addition to the above a prompt fill routine 54 may be invoked before an application is executed. This routine fills the text-to-speech field 50B of the prompt identifiers 44A if there is no voice data 52A associated with them. The routine 54 runs through all the records in the list and initially sets 118 a pointer to the first record on the prompt list. The first query inspects 120 the voice data field 52B. If the field 52B is not blank then the routine passes to the last check. If blank then the second query checks 122 to see if the record has text-to-speech data 50A. If this field 50B is not blank then the routine passes to the last check. If there is no text-to-speech data 50A then the routine passes on to the third query and checks 124 to see if the record has text data 48A. If so then the text-to speech driver 36 is called 126 with the text data 48A, synthesised speech is acquired 128 and stored as text-to-speech data in the field. If there is no text data 48A then the routine passes on to the last check. The last check is to see 130 whether the last record has been reached, if not the routine begins the check sequence with the next record by updating 132 the pointer and starting at the first check. If, on the other hand, the last record is reached the routine ends. If there is no text 48A associated with a prompt identifier 44A then the fill routine 54 can alternatively use the identifier text 44A when calling the text-to-speech driver 36 and filling the text-to-speech field 50B.

Two approaches are described above which store the synthesised voice segments 50A in a database table. However, a different approach is to discard the synthesised text 50A altogether. This has the advantage of keeping the voice directory to an acceptable size since for each voice prompt there would exist two types of voice data. The disadvantage is that there is more processing per voice segment. However for infrequently used voice segments this approach would be most suitable.

Yet another approach would be to, upon generating a prompt using text-to-speech, to save that synthesised prompt for re-use as well as playing that prompt to the caller. Applications where voice prompts need to be updated frequently and automatically—eg weather forecasts or traffic reports would adopt such an approach. The resources needed to synthesize them all (by using the 'prompt fill' routine) could be large and this approach could serve to spread the load over a longer period of time. The ultimate benefit is the same however—any text need only be synthesised once.

In use, a voice application would include a state table 40 using the voice prompts from FIG. 3A imbedded in the state table commands. Such a state table 40 would, for instance, be a date and time voice response system where a caller would dial into the service and request the time or the date. When the application 38 is called and a connection established between the caller and the application, the first voice prompt is played. Using the example of FIG. 3A one can see that voice data 52A exists for the welcome prompt 'Welcome to the application' so that this voice data 52A is played directly through the voice adapter 26. The next prompt is the 'select' prompt where there is no voice data 52A but only synthesised data 50A. The voice routine 42 takes the synthesised data 50A and outputs it using the voice adapter 26 so that the caller is informed that he must select one of the next options. The 'option 1' prompt has both voice data 52A and synthesised data 50A and therefore uses the higher quality voice data 52A for the output. 'Option 2', 'Option 3' and 'Exit' have no voice 52A or synthesised data 50A. For each of these prompts in turn the associated text is acquired form the database and output using the text-to-speech adapter 28.

Although the invention is described with respect to a PowerPC based computer this is not a limiting feature and most computers would be relevant independent of microprocessor. The AIX operating system is also not a limiting factor. The DirectTalk for AIX product is not limiting and any telephony system using voice prompts, a voice adapter and a text-to-speech adapter would be appropriate.

The exact form of the structure of the data is described as a two dimensional format but this is not a limiting feature. It is the relationships of the data which is important. Data stored otherwise than in a table would also be appropriate. Data may also be dynamically stored in the memory or persistently stored on the hard drive.

In summary there is described an interactive voice response application on a computer telephony system which includes a method of playing voice prompts from a mixed set of pre-recorded voice prompts and voice prompts synthesised from a text-to-speech process. The method comprises: reserving memory for a synthesised prompt and a pre-recorded prompt associated with a particular prompt identifier; on a play prompt request selecting the pre-recorded prompt if available and outputing through a voice output; otherwise selecting the synthesised prompt and playing the selected voice prompt through the voice output. If neither pre-recorded or synthesised data are available then text associated with the voice prompt is output through a text-to-speech output.

Now that the invention has been described by way of a preferred embodiment, various modifications and improvements will occur to those persons skilled in the art. Therefore it should be understood that the preferred embodiment has been provided as an example and not as a limitation.

I claim:

1. In an interactive voice response (IVR) development system having a recorded voice generator and a text-to-speech synthesiser, a method of processing a prompt identifier in an IVR application, said IVR application comprising at least one prompt identifier and a prompt database, each prompt identifier having a data structure within the prompt database for storing: associated voice prompt data; associated synthesised prompt data; and associated text prompt data for text-to-speech processing, the method comprising steps:

searching the prompt database for data associated with the prompt identifier;

sending the voice prompt data to the recorded voice generator if voice prompt data is available;

sending the synthesised prompt data to the recorded voice generator if voice prompt data is not available and if the synthesised prompt data is available;

sending text prompt data to the text-to-speech synthesiser if the text prompt data is available and if both voice prompt data and synthesised prompt data are not available.

2. A method as claimed in claim 1 further comprising the step of:

sending the prompt identifier to the text-to-speech synthesiser if no prompt data is located in the prompt database.

3. A method as claimed in claim 1 or 2 further comprising:

when the text-to-speech synthesiser is selected and new synthesised prompt data created, storing the new synthesised prompt data in the prompt database.

4. An interactive voice response (IVR) development system for processing a prompt identifier in an IVR application comprising at least one prompt identifier and a prompt database, each prompt identifier having a structure in the prompt database for storing: associated voice prompt data; associated synthesised prompt data; and associated text prompt data for text-to-speech processing, the system comprising:

a recorded voice generator;

a text-to-speech synthesiser;

means for searching the prompt database for data associated with the prompt identifier;

means for sending the voice prompt data to the recorded voice generator if voice prompt data is available;

means for sending the synthesised prompt data to the recorded voice generator if voice prompt data is not available and if synthesised prompt data is available;

means for sending text prompt data to the text-to-speech synthesiser if text prompt data is available and if both voice prompt data and synthesised prompt data are not available.

5. A system as claimed in claim 4 further comprising:

means for sending the prompt identifier to the text-to-speech synthesiser if none of the voice prompt data, synthesised prompt data or text prompt data is available in the prompt database.

6. A system as claimed in claim 4 or 5 further comprising:

means for storing new synthesised prompt data in the prompt database and associating said new synthesised prompt data with the prompt identifier for future use, when text-to-speech synthesiser is selected and new synthesised prompt data created.

7. A computer-readable storage medium storing a computer program product for processing a prompt identifier when run in an interactive voice response (IVR) development system said computer program product comprising: a recorded voice generator, a text-to-speech synthesiser; and IVR application comprising at least one prompt identifier and a prompt database, each prompt identifier having a structure in the prompt database for storing; associated voice prompt data; associated synthesised prompt data; and associated text prompt data for text-to-speech processing, the stored program executing the steps of:

searching in the prompt database for pre-recorded voice prompt voice data associated the at least one prompt identifier;

sending the voice prompt data to the recorded voice generator if voice prompt data is available;

sending the synthesised prompt data to the recorded voice generator if voice prompt data is not available and if the synthesised prompt data is available;

sending text prompt data to the text-to-speech synthesiser if the text prompt data is available and if both voice prompt data and synthesised prompt data are not available.

8. A computer readable storage medium as claimed in claim 7 further comprising executing the step of:

sending the prompt identifier to the text-to-speech synthesiser if no prompt data is located in the prompt database.

9. A computer readable storage medium as claimed in claim 7 or claim 8, further comprising executing the step of:

when text-to-speech output is selected and new synthesised voice data is created, storing the new synthesised voice data in the prompt database and associating the new synthesised voice data with the prompt identifier.

* * * * *